(12) United States Patent
Marini et al.

(10) Patent No.: US 11,578,608 B1
(45) Date of Patent: Feb. 14, 2023

(54) TURBINE VANE AIRFOIL PROFILE

(71) Applicant: PRATT & WHITNEY CANADA CORP., Longueuil (CA)

(72) Inventors: Remo Marini, Lasalle (CA); Marc Tardif, Candiac (CA); Jason Gillespie, Delson (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/454,520

(22) Filed: Nov. 11, 2021

(51) Int. Cl.
  *F01D 9/04* (2006.01)
  *F01D 5/14* (2006.01)
  *F01D 5/28* (2006.01)

(52) U.S. Cl.
  CPC ............ *F01D 9/041* (2013.01); *F01D 5/141* (2013.01); *F01D 5/288* (2013.01); *F05D 2230/90* (2013.01); *F05D 2240/12* (2013.01); *F05D 2250/74* (2013.01)

(58) Field of Classification Search
  CPC . F01D 5/141; F01D 5/14; F01D 5/143; F01D 5/288; F01D 9/02; F01D 9/041; F05D 2250/74; F05D 2250/70; F05D 2250/20; F05D 2220/32; F05D 2220/3212; F05D 2220/3217; F05D 2220/321; F05D 2220/323; F05D 2230/90; F05D 2240/12; F05D 2240/30; F05D 2240/80; F05D 2240/301; F04D 29/324
  See application file for complete search history.

(56) References Cited

U.S. PATENT DOCUMENTS

| | | | |
|---|---|---|---|
| 6,398,489 B1 | 6/2002 | Burdgick et al. |
| 6,832,897 B2 | 12/2004 | Urban |
| 6,854,961 B2 | 2/2005 | Zhang et al. |
| 6,910,868 B2 | 6/2005 | Hyde et al. |
| 7,306,436 B2 | 12/2007 | Girgis et al. |
| 7,351,038 B2 | 4/2008 | Girgis et al. |
| 7,354,249 B2 | 4/2008 | Girgis et al. |
| 7,367,779 B2 | 5/2008 | Girgis et al. |
| 7,402,026 B2 | 7/2008 | Girgis et al. |
| 7,520,726 B2 | 4/2009 | Papple et al. |
| 7,520,727 B2 | 4/2009 | Sreekanth et al. |
| 7,520,728 B2 | 4/2009 | Sleiman et al. |
| 7,534,091 B2 | 5/2009 | Ravanis et al. |
| 7,537,432 B2 | 5/2009 | Marini et al. |
| 7,537,433 B2 | 5/2009 | Girgis et al. |
| 7,559,746 B2 | 7/2009 | Tsifourdaris et al. |
| 7,559,747 B2 | 7/2009 | Mohan et al. |
| 7,559,748 B2 | 7/2009 | Kidikian et al. |
| 7,559,749 B2 | 7/2009 | Kidikian et al. |
| 7,566,200 B2 | 7/2009 | Marini et al. |
| 7,568,889 B2 | 8/2009 | Mohan et al. |

(Continued)

*Primary Examiner* — Eric J Zamora Alvarez
(74) *Attorney, Agent, or Firm* — Norton Rose Fulbright Canada LLP.

(57) ABSTRACT

A turbine vane for a gas turbine engine has an airfoil including leading and trailing edges joined by spaced-apart pressure and suction sides to provide an external airfoil surface. The surface is formed in substantial conformance with multiple cross-sectional profiles of the airfoil defined by a set of Cartesian coordinates set forth in Table 1, the Cartesian coordinates provided by an axial coordinate scaled by a local axial chord, a circumferential coordinate scaled by a local axial chord, and a span location.

19 Claims, 5 Drawing Sheets

(56) References Cited

U.S. PATENT DOCUMENTS

| | | |
|---|---|---|
| 7,568,890 B2 | 8/2009 | Findlay et al. |
| 7,568,891 B2 | 8/2009 | Mohan et al. |
| 7,611,326 B2 | 11/2009 | Frindade et al. |
| 7,625,182 B2 | 12/2009 | Mah et al. |
| 7,625,183 B2 | 12/2009 | Tsifourdaris et al. |
| 7,632,074 B2 | 12/2009 | Ravanis et al. |
| 8,100,659 B2 | 1/2012 | Marini |
| 8,105,043 B2 | 1/2012 | Tsifourdaris |
| 8,105,044 B2 | 1/2012 | Marini et al. |
| 8,167,568 B2 | 5/2012 | Tsifourdaris |
| 8,439,645 B2 | 5/2013 | Tsifourdaris |
| 2005/0079061 A1 | 4/2005 | Beddard |
| 2008/0124219 A1 | 5/2008 | Kidikian et al. |
| 2009/0097982 A1 | 4/2009 | Saindon et al. |
| 2009/0116967 A1 | 5/2009 | Sleiman et al. |
| 2010/0008784 A1 | 1/2010 | Shafique et al. |
| 2010/0266398 A1* | 10/2010 | Marini ............ F01D 9/02 415/208.1 |
| 2011/0229317 A1 | 9/2011 | Marini |
| 2011/0236214 A1 | 9/2011 | Tsifourdaris |
| 2011/0243747 A1 | 10/2011 | Marini |
| 2011/0243748 A1 | 10/2011 | Tsifourdaris |
| 2013/0164116 A1* | 6/2013 | Tardif ............ F01D 9/041 415/115 |
| 2016/0115797 A1 | 4/2016 | Calla |
| 2020/0232328 A1 | 7/2020 | Song |

\* cited by examiner

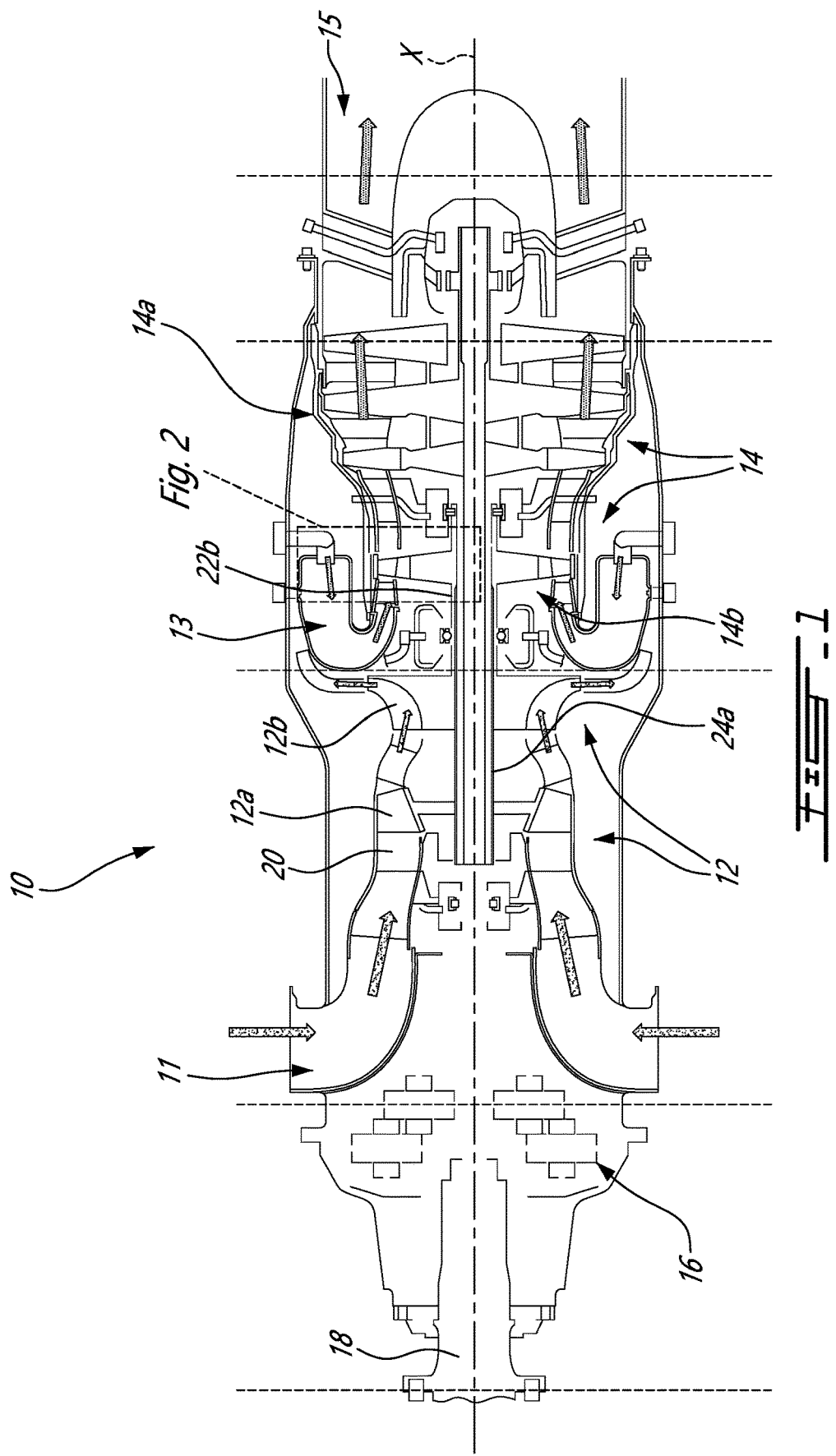

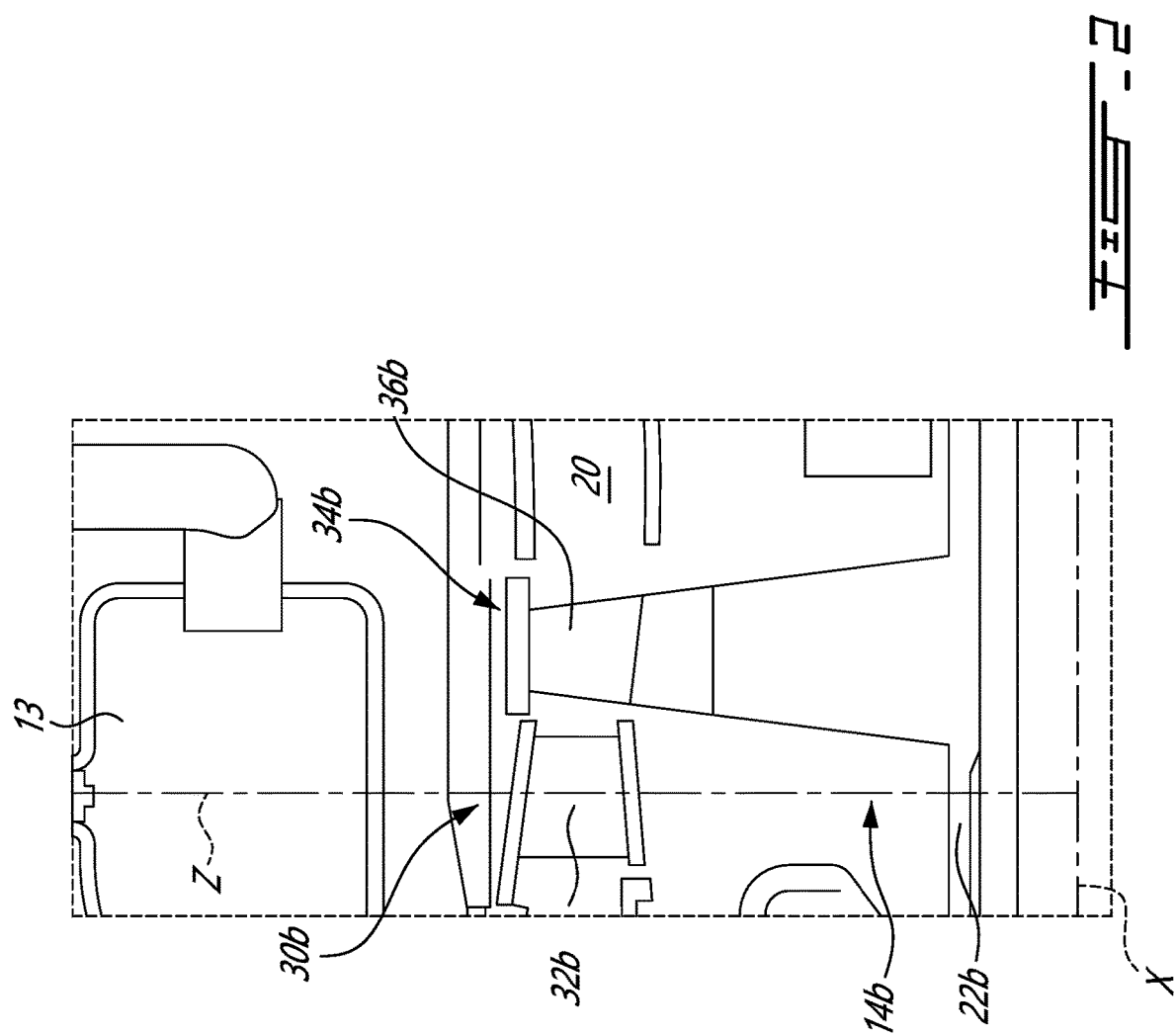

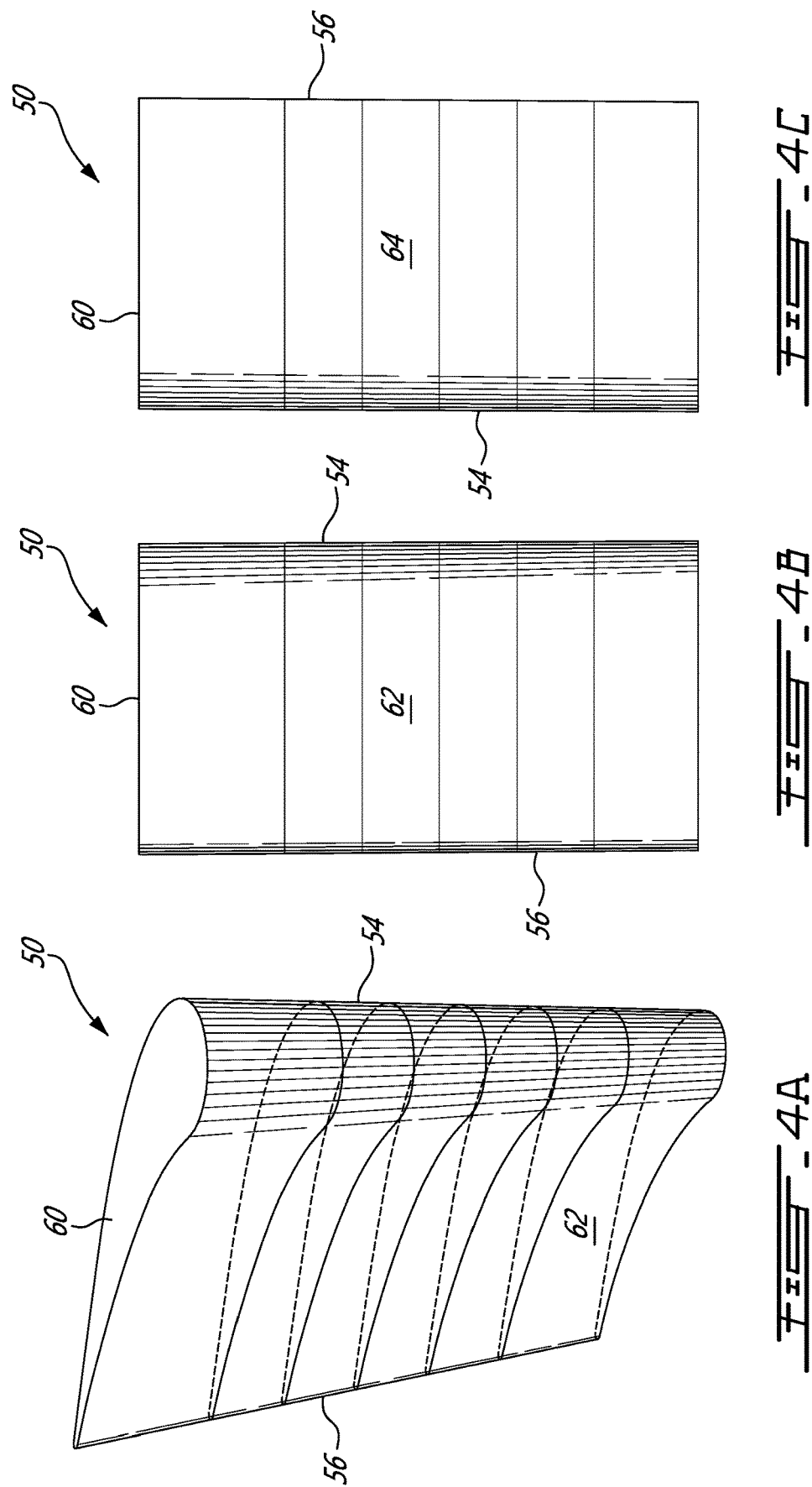

TURBINE VANE AIRFOIL PROFILE

TECHNICAL FIELD

The disclosure relates generally to gas turbine engines and, more particularly, to an airfoil that may be incorporated into a gas turbine engine.

BACKGROUND OF THE ART

Every compressor and turbine stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. Each airfoil is subject to flow regimes which lend themselves easily to flow separation, which tend to limit the amount of work transferred to the compressor, and hence the total power capability of the engine. Turbine airfoils are also subject to harsh temperatures and pressures, which require a solid balance between aerodynamic and structural optimization. Therefore, improvements in airfoil design are sought.

SUMMARY

In one aspect, there is provided a turbine vane for a gas turbine engine, the turbine vane comprising an airfoil including a leading and a trailing edge joined by a pressure and a suction side to provide an external airfoil surface. The external airfoil surface is formed in substantial conformance with multiple cross-sectional profiles of the airfoil defined by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

In another aspect, there is provided a gas turbine engine comprising a high pressure turbine. The high pressure turbine is configured to drive a high pressure compressor. The high pressure turbine comprises an array of turbine vanes, wherein at least one of the turbine vanes of the array comprises an airfoil having leading and trailing edges joined by spaced-apart pressure and suction sides to provide an external airfoil surface. The external airfoil surface is formed in substantial conformance with multiple cross-section profiles of the airfoil defined by a set of Cartesian coordinates set forth in Table 1. The Cartesian coordinates are provided by an axial coordinate scaled by a local axial chord, a circumferential coordinate scaled by the local axial chord, and a span location, wherein the local axial chord corresponds to a width of the airfoil between the leading and trailing edges at the span location.

In a further aspect, there is provided a high pressure turbine vane comprising: an airfoil having an external airfoil surface formed in substantial conformance with multiple cross-section airfoil profiles defined by a set of Cartesian coordinates set forth in Table 1.

In a still further aspect, there is provided a high pressure turbine configured to drive a high pressure compressor; wherein the high pressure turbine comprises at least one stage of turbine vanes, wherein at least one of the turbine vanes of the at least one stage comprises an airfoil having leading and trailing edges joined by spaced-apart pressure and suction sides to provide an external airfoil surface; and wherein the external airfoil surface is formed in substantial conformance with multiple cross-section profiles of the airfoil defined by a set of Cartesian coordinates set forth in Table 1, the Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

DESCRIPTION OF THE DRAWINGS

Reference is now made to the accompanying figures in which:

FIG. 1 is a schematic cross-section view of a gas turbine engine;

FIG. 2 is a cross-section side view of a high pressure (HP) turbine section of the gas turbine engine;

FIG. 4a is an isometric view of an exemplary HP turbine airfoil corresponding to the directional references of FIG. 3b;

FIG. 4b is a pressure side view of the exemplary HP turbine airfoil shown in FIG. 4a;

FIG. 4c is a suction side view of the exemplary HP turbine airfoil shown in FIG. 4a.

DETAILED DESCRIPTION

Figure 3A:
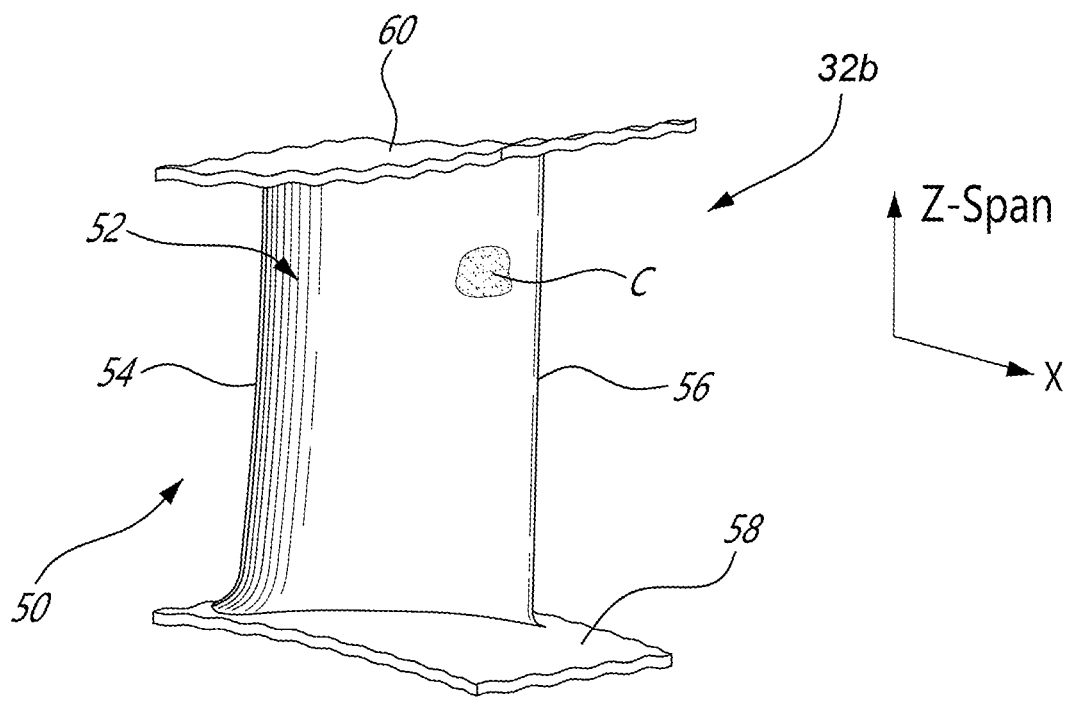
FIG. 3a is an isometric view of a first stage HP turbine vane.

FIG. 1 illustrates an example of a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. According to the illustrated exemplary engine, the turbine 14 is drivingly connected to an input end of a reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. Still according to the illustrated embodiment, all the compressor and the turbine rotors are mounted in-line for rotation about the engine centerline X. However, it is understood that the turbine and compressor rotors could have different rotation axes. Also, it is understood that the concepts described herein are not limited to use with turboprop or turboshaft engines as the teachings may be applied to other types of turbine engines including various engine architectures. Furthermore, while the illustrated exemplary engine is a two-spool engine, it is understood that the engine could include a different number of spools. For instance, the engine could have 1 to 3 spools.

Still referring to FIG. 1, it can be seen that the exemplified engine 10 has an axially extending central core which defines an annular gaspath 20 through which gases flow, as depicted by flow arrows in FIG. 1. The exemplary embodiment shown in FIG. 1 is a "through flow" engine because gases flow through the gaspath 20 from the air inlet 11 at a front portion of the engine 10, to the exhaust 15 at a rear portion thereof. However, it is understood that the engine 10 could adopt different configurations, including a reverse flow configuration, the engine configuration illustrated in FIG. 1 being provided for illustrative purposes only.

The terms "upstream" and "downstream" used herein refer to the direction of an air/gas flow passing through the gaspath 20 of the engine 10. It should also be noted that the terms "axial", "radial", "angular" and "circumferential" are used with respect to the rotation axes of the turbine and compressor rotors (i.e. the engine centerline X in the exemplary engine).

According to the illustrated embodiment, the turbine 14 comprises a low pressure (LP) turbine 14a and a high pressure (HP) turbine 14b. The HP turbine 14b is drivingly connected to an HP compressor 12b via an HP shaft 22b. The HP turbine 14b, the HP shaft 22b and the HP compressor 12b form one of the two spools of the engine 10, namely the HP spool. According to the illustrated embodiment, the HP turbine 14b and the HP compressor 12b each have a single stage of rotating blades. However, it is understood that the HP turbine 14b and the HP compressor 12b could have any suitable number of stages.

Still according to the illustrated embodiment, the LP turbine 14a is drivingly connected to an LP compressor 12a via an LP shaft 24a. The LP turbine 14a, the LP shaft 24a and the LP compressor 12a form the other one of the two spools of the engine 10, namely the LP spool. The HP spool and the LP spool are independently rotatable. According to the illustrated embodiment, the LP turbine 14a has three stages of turbine blades, whereas the LP compressor 12a has a single stage of LP compressor blades. However, it is understood that the LP turbine 14a and the LP compressor 12a could have any suitable number of stages.

The LP shaft 24a is drivingly connected to the input end of the RBG 16 to drive the output shaft 18. Accordingly, the LP turbine 14a (also known as the power turbine) can be used to drive both the LP compressor 12a and the output shaft 18. An additional gearbox or the like (not shown) can be provided between the LP compressor 12a and the LP turbine 14a to allow the LP compressor 12a to rotate at a different speed from the LP turbine 14a.

In use, the air flowing through the inlet 11 is compressed by the LP compressor 12a then the HP compressor 12b, mixed and burned with fuel in the combustor 13, then expanded over the HP turbine 14b and the LP turbine 14a before being discharged through the exhaust 15. The HP turbine 14b drives the HP compressor 12b, whereas the LP turbine 14a drives the LP compressor 12a and the output shaft 18.

Referring to FIG. 2, it can be appreciated that the HP turbine 14b comprises series of rotating blades and stationary vanes that extends into the gaspath 20 of the engine 10. In the illustrated example, the HP turbine 14b has a single stage including a first array 30b of circumferentially spaced-apart stationary vanes 32b disposed at the outlet of the combustor 13 for directing the combustion gases to a first stage array 34b of circumferentially spaced-apart HP turbine blades 36b disposed axially between the first array 30b of HP turbine vanes 32b and a first stage array of LP turbine vanes. The first stage HP turbine vanes 32b are mounted in position along axis Z in FIG. 2.

Figure 3B:
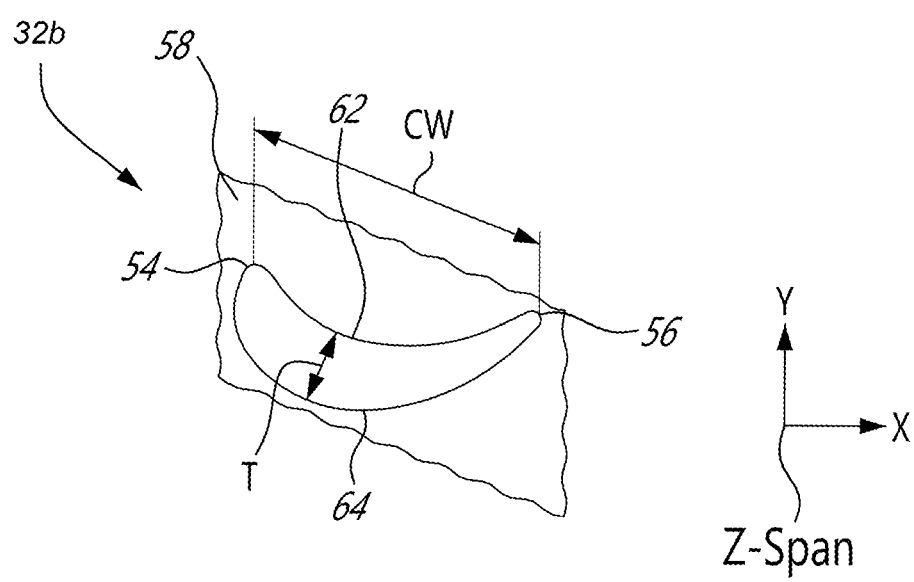
FIG. 3b is a plan, top view of the turbine vane of FIG. 3a illustrating directional references.

FIGS. 3a and 3b schematically illustrate an example of an HP turbine vane profile suitable for use as a first stage or second stage HP turbine vane. According to the illustrated embodiment, the HP turbine vane is a first stage HP turbine vane. It can be seen that the exemplary HP turbine vane 32b includes an airfoil 50 having an external/exterior surface 52 extending in a chordwise direction CW between a leading edge 54 and a trailing edge 56 and in a spanwise direction Z from an inner gaspath wall 58 to an outer gas path wall 60 of the gaspath 20. The airfoil 50 is provided between pressure and suction sides 62, 64 in an airfoil thickness direction T.

The exterior surface 52 of the airfoil 50 generates lift based upon its geometry and direct flow to the HP turbine blades 36b. Various views of the airfoil 50 of the HP turbine vane 32b are shown in FIGS. 4a-4c. In one example, the HP vane array 30b consists of twenty-seven (27) turbine vanes 32b, but the number may vary according to engine size. The turbine vanes can be constructed from a high-strength, heat-resistant material such as a nickel-based or cobalt-based superalloy, or of a high-temperature, stress-resistant ceramic or composite material, for example. In cooled configurations, internal fluid passages and external cooling apertures provide for a combination of impingement and film cooling. In addition, one or more thermal barrier coatings (TBC), abrasion-resistant coatings, and/or other protective coatings may be applied to the vane.

Figure 5:
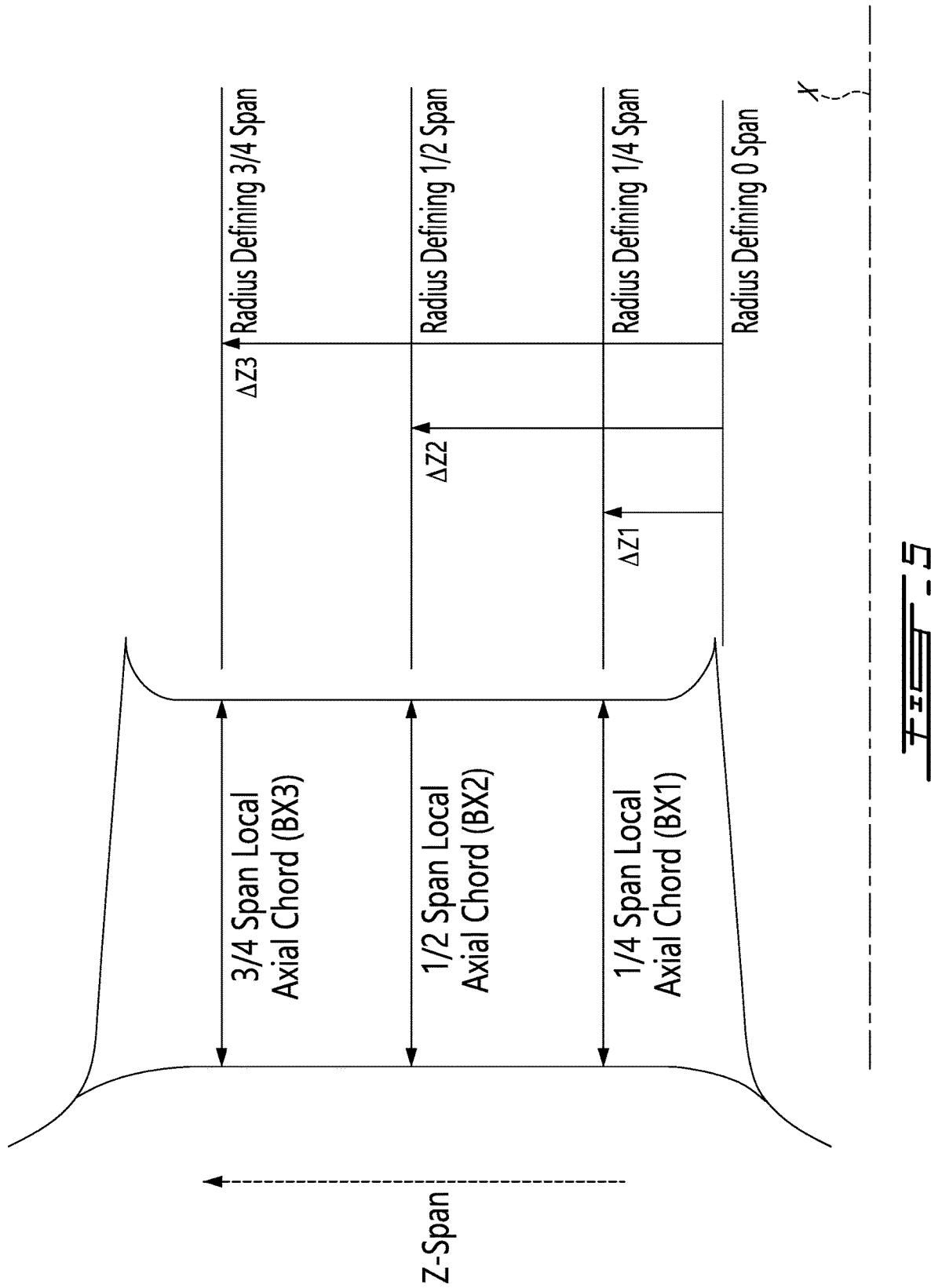
FIG. 5 depicts the span positions and local axial chords reference in Table 1.

Referring to FIG. 5, the geometries of external surfaces of airfoil are defined in terms of Cartesian coordinates defined along x, y, and z axes, which respectively correspond to the axial (x), circumferential/tangential (y), and span/radial (Z-span) (z) directions shown in FIGS. 3a and 3b. The span coordinate is provided as a radial distance ($\Delta$ZI-$\Delta$Z3) from the axis X. The "0" span is taken at a point P where the airfoil meets the inner gaspath wall 58, as schematically illustrated in FIG. 5. The overall or full span is 100% the distance from the point P to the outer gaspath wall 60 in the span direction Z-span. By way of example, the "¼ span" ($\Delta$Z1) is 25% the distance from the point P toward the outer gaspath wall 60 in the span direction Z-span.

The axial (x) and circumferential (y) coordinates are normalized by the local axial chord (Bx) for the 3 given span locations ($\Delta$Z1, $\Delta$Z2, $\Delta$Z3). By way of example, local axial chord (Bx1) for axial (x) and circumferential (y) coordinates associated with the ¼ span ($\Delta$Z1) corresponds to the width of the airfoil between the leading and trailing edges 54, 56 at the ¼ span location ($\Delta$Z1).

The contour of the airfoil is set forth in Table 1, which provides the axial (x) and circumferential (y) coordinates (in inches) scaled by the local axial chord (Bx) for given span locations or positions. 3-D airfoil surfaces are formed by joining adjacent points in Table 1 in a smooth manner and joining adjacent sections or sectional profiles along the span. The manufacturing tolerance relative to the specified coordinates is ±0.050 inches (±1.27 mm). The coordinates define points on a cold, uncoated, stationary airfoil surface at nominal definition, in a plane at the corresponding span positions. Additional elements such as cooling holes, protective coatings, fillets, and seal structures may also be formed onto the specified airfoil surface, or onto an adjacent gaspath surface, but these elements are not necessarily defined by the normalized coordinates. For example, a variable coating C may be applied between 0.0001 inches (0.003 mm) and 0.01 inches (0.28 mm) thick. According to one particular embodiment, a constant coating of 0.0015 (0.0381 mm) inches is applied.

TABLE 1

REFERENCE RADIUS: Z1
SECTION COORDINATES (X,Y)/BX

| X | Y |
|---|---|
| 0.000 | −0.208 |
| 0.002 | −0.223 |
| 0.005 | −0.247 |
| 0.012 | −0.269 |
| 0.021 | −0.288 |
| 0.032 | −0.307 |
| 0.043 | −0.320 |
| 0.055 | −0.334 |
| 0.075 | −0.350 |
| 0.100 | −0.363 |
| 0.125 | −0.373 |
| 0.150 | −0.380 |
| 0.175 | −0.385 |
| 0.200 | −0.387 |
| 0.225 | −0.388 |
| 0.250 | −0.386 |
| 0.275 | −0.383 |
| 0.300 | −0.378 |
| 0.325 | −0.371 |
| 0.350 | −0.363 |
| 0.375 | −0.352 |
| 0.400 | −0.339 |
| 0.425 | −0.325 |
| 0.450 | −0.309 |
| 0.475 | −0.290 |
| 0.500 | −0.270 |
| 0.525 | −0.247 |
| 0.550 | −0.223 |
| 0.575 | −0.196 |
| 0.600 | −0.166 |
| 0.625 | −0.134 |
| 0.650 | −0.099 |
| 0.675 | −0.062 |
| 0.700 | −0.021 |
| 0.725 | 0.023 |
| 0.750 | 0.070 |
| 0.775 | 0.122 |
| 0.800 | 0.178 |
| 0.825 | 0.240 |
| 0.850 | 0.307 |
| 0.875 | 0.379 |
| 0.900 | 0.456 |
| 0.925 | 0.537 |
| 0.943 | 0.596 |
| 0.959 | 0.647 |
| 0.972 | 0.689 |
| 0.982 | 0.722 |
| 0.988 | 0.742 |
| 0.993 | 0.759 |
| 0.997 | 0.772 |
| 0.999 | 0.780 |
| 1.000 | 0.789 |
| 0.999 | 0.793 |
| 0.997 | 0.797 |
| 0.993 | 0.801 |
| 0.988 | 0.803 |
| 0.982 | 0.804 |
| 0.972 | 0.800 |
| 0.959 | 0.776 |
| 0.943 | 0.745 |
| 0.925 | 0.711 |
| 0.900 | 0.667 |
| 0.875 | 0.626 |
| 0.850 | 0.587 |
| 0.825 | 0.550 |
| 0.800 | 0.514 |
| 0.775 | 0.480 |
| 0.750 | 0.447 |
| 0.725 | 0.416 |
| 0.700 | 0.385 |
| 0.675 | 0.356 |
| 0.650 | 0.328 |
| 0.625 | 0.300 |
| 0.600 | 0.274 |
| 0.575 | 0.249 |
| 0.550 | 0.225 |
| 0.525 | 0.202 |
| 0.500 | 0.180 |
| 0.475 | 0.159 |
| 0.450 | 0.139 |
| 0.425 | 0.120 |
| 0.400 | 0.102 |
| 0.375 | 0.085 |
| 0.350 | 0.069 |
| 0.325 | 0.053 |
| 0.300 | 0.039 |
| 0.275 | 0.025 |
| 0.250 | 0.012 |
| 0.225 | −0.001 |
| 0.200 | −0.012 |
| 0.175 | −0.023 |
| 0.150 | −0.034 |
| 0.125 | −0.044 |
| 0.100 | −0.055 |
| 0.075 | −0.068 |
| 0.055 | −0.083 |
| 0.043 | −0.097 |
| 0.032 | −0.110 |
| 0.021 | −0.129 |
| 0.012 | −0.147 |
| 0.005 | −0.170 |
| 0.002 | −0.194 |

REFERENCE RADIUS: Z2
SECTION COORDINATES (X,Y)/BX

| X | Y |
|---|---|
| 0.000 | −0.189 |
| 0.002 | −0.207 |
| 0.005 | −0.231 |
| 0.012 | −0.255 |
| 0.021 | −0.274 |
| 0.032 | −0.294 |
| 0.043 | −0.308 |
| 0.055 | −0.322 |
| 0.075 | −0.339 |
| 0.100 | −0.354 |
| 0.125 | −0.365 |
| 0.150 | −0.374 |
| 0.175 | −0.379 |
| 0.200 | −0.382 |
| 0.225 | −0.383 |
| 0.250 | −0.382 |
| 0.275 | −0.380 |
| 0.300 | −0.374 |
| 0.325 | −0.367 |
| 0.350 | −0.359 |
| 0.375 | −0.348 |
| 0.400 | −0.335 |
| 0.425 | −0.321 |
| 0.450 | −0.304 |
| 0.475 | −0.285 |
| 0.500 | −0.264 |
| 0.525 | −0.241 |
| 0.550 | −0.215 |
| 0.575 | −0.187 |
| 0.600 | −0.157 |
| 0.625 | −0.123 |
| 0.650 | −0.088 |
| 0.675 | −0.049 |
| 0.700 | −0.007 |
| 0.725 | 0.038 |
| 0.750 | 0.088 |
| 0.775 | 0.142 |
| 0.800 | 0.201 |
| 0.825 | 0.266 |
| 0.850 | 0.337 |
| 0.875 | 0.415 |
| 0.900 | 0.497 |
| 0.925 | 0.581 |
| 0.943 | 0.644 |
| 0.959 | 0.697 |
| 0.972 | 0.742 |
| 0.982 | 0.777 |
| 0.988 | 0.798 |
| 0.993 | 0.815 |
| 0.997 | 0.829 |
| 0.999 | 0.837 |
| 1.000 | 0.847 |
| 0.999 | 0.850 |

TABLE 1-continued

| | |
|---|---|
| 0.997 | 0.855 |
| 0.993 | 0.859 |
| 0.988 | 0.861 |
| 0.982 | 0.861 |
| 0.972 | 0.857 |
| 0.959 | 0.832 |
| 0.943 | 0.801 |
| 0.925 | 0.766 |
| 0.900 | 0.722 |
| 0.875 | 0.680 |
| 0.850 | 0.640 |
| 0.825 | 0.601 |
| 0.800 | 0.564 |
| 0.775 | 0.529 |
| 0.750 | 0.494 |
| 0.725 | 0.461 |
| 0.700 | 0.429 |
| 0.675 | 0.398 |
| 0.650 | 0.368 |
| 0.625 | 0.340 |
| 0.600 | 0.312 |
| 0.575 | 0.285 |
| 0.550 | 0.260 |
| 0.525 | 0.236 |
| 0.500 | 0.213 |
| 0.475 | 0.191 |
| 0.450 | 0.170 |
| 0.425 | 0.150 |
| 0.400 | 0.132 |
| 0.375 | 0.114 |
| 0.350 | 0.097 |
| 0.325 | 0.081 |
| 0.300 | 0.066 |
| 0.275 | 0.052 |
| 0.250 | 0.038 |
| 0.225 | 0.025 |
| 0.200 | 0.013 |
| 0.175 | 0.002 |
| 0.150 | −0.009 |
| 0.125 | −0.019 |
| 0.100 | −0.030 |
| 0.075 | −0.045 |
| 0.055 | −0.060 |
| 0.043 | −0.075 |
| 0.032 | −0.088 |
| 0.021 | −0.108 |
| 0.012 | −0.128 |
| 0.005 | −0.151 |
| 0.002 | −0.176 |

REFERENCE RADIUS: Z3
SECTION COORDINATES (X,Y)/BX3

| | |
|---|---|
| 0.000 | −0.170 |
| 0.002 | −0.191 |
| 0.005 | −0.216 |
| 0.012 | −0.241 |
| 0.021 | −0.261 |
| 0.032 | −0.281 |
| 0.043 | −0.295 |
| 0.055 | −0.311 |
| 0.075 | −0.329 |
| 0.100 | −0.345 |
| 0.125 | −0.357 |
| 0.150 | −0.367 |
| 0.175 | −0.372 |
| 0.200 | −0.377 |
| 0.225 | −0.378 |
| 0.250 | −0.377 |
| 0.275 | −0.375 |
| 0.300 | −0.370 |
| 0.325 | −0.364 |
| 0.350 | −0.354 |
| 0.375 | −0.344 |
| 0.400 | −0.331 |
| 0.425 | −0.316 |
| 0.450 | −0.299 |
| 0.475 | −0.280 |
| 0.500 | −0.259 |
| 0.525 | −0.235 |
| 0.550 | −0.209 |
| 0.575 | −0.180 |
| 0.600 | −0.149 |
| 0.625 | −0.115 |
| 0.650 | −0.077 |
| 0.675 | −0.037 |
| 0.700 | 0.006 |
| 0.725 | 0.053 |
| 0.750 | 0.104 |
| 0.775 | 0.161 |
| 0.800 | 0.222 |
| 0.825 | 0.290 |
| 0.850 | 0.365 |
| 0.875 | 0.447 |
| 0.900 | 0.533 |
| 0.925 | 0.622 |
| 0.943 | 0.688 |
| 0.959 | 0.745 |
| 0.972 | 0.794 |
| 0.982 | 0.831 |
| 0.988 | 0.853 |
| 0.993 | 0.871 |
| 0.997 | 0.886 |
| 0.999 | 0.895 |
| 1.000 | 0.900 |
| 0.999 | 0.908 |
| 0.997 | 0.913 |
| 0.993 | 0.916 |
| 0.988 | 0.919 |
| 0.982 | 0.919 |
| 0.972 | 0.914 |
| 0.959 | 0.889 |
| 0.943 | 0.857 |
| 0.925 | 0.822 |
| 0.900 | 0.776 |
| 0.875 | 0.733 |
| 0.850 | 0.692 |
| 0.825 | 0.652 |
| 0.800 | 0.614 |
| 0.775 | 0.577 |
| 0.750 | 0.541 |
| 0.725 | 0.507 |
| 0.700 | 0.473 |
| 0.675 | 0.440 |
| 0.650 | 0.409 |
| 0.625 | 0.379 |
| 0.600 | 0.349 |
| 0.575 | 0.322 |
| 0.550 | 0.295 |
| 0.525 | 0.269 |
| 0.500 | 0.245 |
| 0.475 | 0.222 |
| 0.450 | 0.201 |
| 0.425 | 0.180 |
| 0.400 | 0.161 |
| 0.375 | 0.142 |
| 0.350 | 0.125 |
| 0.325 | 0.108 |
| 0.300 | 0.093 |
| 0.275 | 0.078 |
| 0.250 | 0.064 |
| 0.225 | 0.051 |
| 0.200 | 0.039 |
| 0.175 | 0.028 |
| 0.150 | 0.017 |
| 0.125 | 0.006 |
| 0.100 | −0.006 |
| 0.075 | −0.021 |
| 0.055 | −0.038 |
| 0.043 | −0.053 |
| 0.032 | −0.067 |
| 0.021 | −0.087 |
| 0.012 | −0.109 |
| 0.005 | −0.131 |
| 0.002 | −0.158 |

This set of points represents a novel and unique solution to the target design criteria mentioned herein above, and are well-adapted for use in a first or second stage of a high pressure turbine. For instance, the vane airfoil defined by the coordinates in table 1 could be used in the pressure turbine vane array 30b of exemplified engine 10. According to at least some embodiments, the turbine airfoil profile is particularly configured to improve the service life of the HP turbine vanes 32b.

In general, the turbine vane airfoil 50, as described herein, has a combination of axial sweep and tangential lean. Depending on configuration, the lean and sweep angles sometimes vary by up to ±10° or more. In addition, the turbine blade is sometimes rotated with respect to a radial axis or a normal to the platform or shroud surface, for example, by up to ±10° or more.

Novel aspects of the turbine vane and associated airfoil surfaces described herein are achieved by substantial conformance to specified geometries. Substantial conformance generally includes or may include a manufacturing tolerance of ±0.05 inches (±1.27 mm), in order to account for variations in molding, cutting, shaping, surface finishing and other manufacturing processes, and to accommodate variability in coating thicknesses. This tolerance is generally constant or not scalable, and applies to each of the specified vane surfaces, regardless of size.

Substantial conformance is based on sets of points representing a three-dimensional surface with particular physical dimensions, for example, in inches or millimeters, as determined by selecting particular values of the scaling parameters. A substantially conforming airfoil or vane structure has surfaces that conform to the specified sets of points, within the specified tolerance.

Alternatively, substantial conformance is based on a determination by a national or international regulatory body, for example, in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure complies with airworthiness standards applicable to the specified blade, vane, or airfoil. In particular, substantial conformance encompasses any regulatory determination that a particular part or structure is sufficiently similar to, identical to, or the same as a specified blade, vane, or airfoil, such that certification or authorization for use is based at least in part on the determination of similarity.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present disclosure includes several aspects and embodiments that include particular features. Although these particular features may be described individually, it is within the scope of the present disclosure that some or all of these features may be combined with any one of the aspects and remain within the scope of the present disclosure. Yet further modifications could be implemented by a person of ordinary skill in the art in view of the present disclosure, which modifications would be within the scope of the present technology.

The invention claimed is:

1. A turbine vane for a gas turbine engine, the turbine vane comprising:
   an airfoil having a leading edge and a trailing edge joined by a pressure side and a suction side to provide an external airfoil surface; and
   wherein the external airfoil surface is formed in substantial conformance with cross-section profiles of the airfoil defined by a set of Cartesian coordinates set forth in Table 1, the set of Cartesian coordinates provided by an axial coordinate scaled by a local axial chord, a circumferential coordinate scaled by the local axial chord, and a span location, wherein the local axial chord corresponds to a width of the airfoil between the leading edge and the trailing edge at the span location.

2. The turbine vane according to claim 1, wherein the airfoil is a high pressure turbine vane.

3. The turbine vane according to claim 1, wherein the airfoil is a first-stage or a second-stage high pressure turbine vane.

4. The turbine vane according to claim 1, wherein the external airfoil surface is formed in conformance with the cross-section profiles of the airfoil defined by the set of Cartesian coordinates set forth in Table 1 to a tolerance of ±0.050 inches (±1.27 mm).

5. The turbine vane according to claim 1, wherein the external airfoil surface is a cold, uncoated airfoil surface at nominal definition.

6. The turbine vane according to claim 5, further comprising a coating over the external airfoil surface.

7. A high pressure turbine vane comprising:
   an airfoil having an external airfoil surface formed in substantial conformance with cross-section airfoil profiles defined by a set of Cartesian coordinates set forth in Table 1.

8. The high pressure turbine vane according to claim 7, wherein the external airfoil surface is a cold, uncoated airfoil surface at nominal definition.

9. The high pressure turbine vane according to claim 7, wherein the external airfoil surface is formed in conformance with the cross-section profiles of the airfoil defined by the set of Cartesian coordinates set forth in Table 1 to a tolerance of ±0.050 inches (±1.27 mm).

10. The high pressure turbine vane according to claim 8, further comprising a coating over the external airfoil surface.

11. A gas turbine engine comprising:
    a high pressure (HP) turbine configured to drive a high pressure compressor;
    wherein the HP turbine comprises at least one stage of turbine vanes, wherein at least one of the turbine vanes of the at least one stage comprises an airfoil having leading and trailing edges joined by spaced-apart pressure and suction sides to provide an external airfoil surface; and
    wherein the external airfoil surface is formed in substantial conformance with cross-section profiles of the airfoil defined by a set of Cartesian coordinates set forth in Table 1, the set of Cartesian coordinates provided by an axial coordinate scaled by a local axial chord, a circumferential coordinate scaled by the local axial chord, and a span location, wherein the local axial chord corresponds to a width of the airfoil between the leading and trailing edges at the span location.

12. The gas turbine engine according to claim 11, wherein the span location corresponds to a distance from a rotation axis of the high pressure turbine.

13. The gas turbine engine according to claim 11, wherein the external airfoil surface is formed in conformance with the cross-section profiles of the airfoil defined by the set of Cartesian coordinates set forth in Table 1 to a tolerance of ±0.050 inches (±1.27 mm).

14. The gas turbine engine according to claim 11, wherein the external airfoil surface is a cold, uncoated airfoil surface at nominal definition.

15. The gas turbine engine according to claim 11, wherein the at least one stage of turbine vanes includes one or two stages, and wherein the at least one of the turbine vanes is a first stage or a second stage HP turbine vane.

16. The gas turbine engine according to claim 15, wherein the at least one stage of turbine vanes includes a single stage of HP turbine blades.

17. The gas turbine engine according to claim 11, wherein the at least one stage of turbine vanes of the high pressure turbine comprises twenty-seven (27) turbine airfoils.

18. The gas turbine engine according to claim 11, wherein the gas turbine engine is a turboprop or a turboshaft engine having 1 to 3 independently rotatable spools.

19. The gas turbine engine according to claim 14, further comprising a coating over the external airfoil surface.

* * * * *